US008754150B2

(12) United States Patent
Flakus et al.

(10) Patent No.: US 8,754,150 B2
(45) Date of Patent: Jun. 17, 2014

(54) COPOLYMER HAVING POLYETHER SIDE CHAINS AND DICARBOXYLIC ACID DERIVATIVE COMPONENTS

(75) Inventors: Silke Flakus, Ebersberg (DE); Klaus Lorenz, Zangberg (DE); Gerhard Albrecht, Prien am Chiemsee (DE); Helmut Mack, Traunstein (DE); Angelika Hartl, Emertsham (DE); Martin Winklbauer, Halsbach (DE); Petra Wagner, Trostberg (DE); Barbara Wimmer, Tacherting (DE); Christian Scholz, Wald an der Alz (DE)

(73) Assignee: Construction Research & Technology GmbH, Trostberg (DE)

( * ) Notice: Subject to any disclaimer, the term of this patent is extended or adjusted under 35 U.S.C. 154(b) by 782 days.

(21) Appl. No.: 12/867,028

(22) PCT Filed: Jan. 12, 2009

(86) PCT No.: PCT/EP2009/050264
§ 371 (c)(1),
(2), (4) Date: Sep. 29, 2010

(87) PCT Pub. No.: WO2009/100959
PCT Pub. Date: Aug. 20, 2009

(65) Prior Publication Data
US 2011/0009529 A1    Jan. 13, 2011

(30) Foreign Application Priority Data

Feb. 13, 2008 (EP) .................................. 08101597

(51) Int. Cl.
*C04B 24/26* (2006.01)
*C08F 222/40* (2006.01)
*C08F 222/06* (2006.01)
*C08L 39/06* (2006.01)
*C08L 39/08* (2006.01)

(52) U.S. Cl.
USPC ............... 524/5; 524/808; 524/811; 524/318; 524/832; 524/271; 524/262

(58) Field of Classification Search
CPC ..... C04B 24/26; C08F 222/40; C08F 222/06; C08L 39/06; C08L 39/08
USPC ............... 524/5, 808, 811, 318, 832, 271, 262
See application file for complete search history.

(56) References Cited

U.S. PATENT DOCUMENTS

| 5,064,563 | A | 11/1991 | Yamaguchi et al. |
| 5,453,123 | A | 9/1995 | Burge et al. |
| 5,798,425 | A | 8/1998 | Albrecht et al. |
| 6,211,317 | B1 | 4/2001 | Albrecht et al. |
| 2006/0062754 | A1* | 3/2006 | Kasuya et al. ............. 424/78.27 |
| 2007/0161724 | A1 | 7/2007 | Moraru et al. |

FOREIGN PATENT DOCUMENTS

| EP | 0 056 627 A2 | 7/1982 |
| EP | 0 396 303 A2 | 11/1990 |
| EP | 0 396 303 B1 | 12/1994 |
| EP | 0 798 320 A2 | 10/1997 |
| EP | 0 850 894 A1 | 7/1998 |
| EP | 1 528 045 A2 | 5/2005 |
| GB | 2 280 180 A | 1/1995 |
| WO | WO 2005/075539 A2 | 8/2005 |

OTHER PUBLICATIONS

PCT/EP2009/050264—International Search Report, Feb. 19, 2009.
PCT/EP2009/050264—Written Opinion of the International Searching Authority, Feb. 19, 2009.
European Notice of Opposition, mailing date Mar. 15, 2012.
Combined dictionary page and table cited in the aforementioned European Notice of Opposition, 1995.

\* cited by examiner

*Primary Examiner* — James J Seidleck
*Assistant Examiner* — Deve E Valdez
(74) *Attorney, Agent, or Firm* — Curatolo Sidoti Co., LPA; Joseph G. Curatolo; Salvatore A. Sidoti

(57) ABSTRACT

The invention relates to a copolymer which can be used as a superplasticizer for hydraulic binders and comprises 30 to 47 mol % of a (meth)allyl alcohol polyether derivative structural unit and 53 to 70 mol % of a maleic acid derivative structural unit.

20 Claims, No Drawings

COPOLYMER HAVING POLYETHER SIDE CHAINS AND DICARBOXYLIC ACID DERIVATIVE COMPONENTS

CROSS REFERENCE TO RELATED APPLICATIONS

This application is a national stage application of International Application No. PCT/EP2009/050264, filed 12 Jan. 2009, which claims priority from European Patent Application Serial No. 08 101 597.6, filed 13 Feb. 2008, from which applications priority is claimed, and which are incorporated herein by reference.

The present invention relates to a copolymer, the preparation of the copolymer and a building material mixture.

It is known that admixtures in the form of dispersants are often added to aqueous slurries of pulverulent inorganic or organic substances, such as clays, silicate powder, chalk, carbon black, crushed rock and hydraulic binders, for improving their processability, i.e. kneadability, spreadability, sprayability, pumpability or flowability. Such admixtures are capable of preventing the formation of solid agglomerates, dispersing already present particles and particles newly formed by hydration and in this way improving the processability. This effect is also utilized in a targeted manner in particular in the production of building material mixtures which contain hydraulic binders, such as cement, lime, gypsum, hemihydrate or anhydrite.

In order to convert these building material mixtures based on said binders into a ready-to-use, processable form, as a rule substantially more mixing water is required than would be necessary for the subsequent hydration or hardening process. The proportion of cavities which are formed by the excess, subsequently evaporating water in the concrete body leads to significantly poorer mechanical strengths and stabilities.

In order to reduce this excess proportion of water at a specified processing consistency and/or to improve the processability at a specified water/binder ratio, admixtures that are generally referred to as water-reducing agents or superplasticizers are used. Agents of this type which are used in practice are in particular copolymers which are prepared by free radical copolymerization of acid monomers and/or acid derivative monomers with polyether macromonomers.

WO 2005/075529 describes copolymers which, in addition to acid monomer structural units, have vinyloxybutylenepoly (ethylene glycol) structural units as polyether macromonomer structural units. Such copolymer types are widely used as high-performance superplasticizers since they have excellent performance characteristics. In this context, the robustness or universality with regard to the use of different cements, different mixing procedures and different temperatures of use should be particularly singled out. The concrete containing these high-performance superplasticizers is usually distinguished by particularly good processability.

The vinyloxybutylenepoly(ethylene glycol) used as a monomeric precursor of these copolymers is obtained by ethoxylation of 4-hydroxybutyl vinyl ether. 4-Hydroxybutyl vinyl ether is an industrial secondary product of acetylene. Owing to the fact that the chemistry based on acetylene (Reppe chemistry) has been very substantially replaced by the chemistry based on ethylene, the industrial production of 4-hydroxybutyl vinyl ether is associated with the few industrial locations still operating Reppe chemistry. It can also usually be assumed that 4-hydroxybutyl vinyl ether cannot or will not be able to be particularly economically prepared as a product of the Reppe chemistry, which is complicated particularly in point of view of safety. The abovementioned accordingly also affects the availability and the costs of vinyloxybutylenepoly(ethylene glycol) and the corresponding copolymers.

The object of the present invention is therefore to provide an economical dispersant for hydraulic binders which is particularly suitable as a superplasticizer/water-reducing agent for concrete.

This object is achieved by a copolymer comprising
i) 30 to 47 mol % of a (meth)allyl alcohol polyether derivative structural unit α and
ii) 53 to 70 mol % of a maleic acid derivative structural unit β.

the (meth)allyl alcohol polyether derivative structural unit α being represented by the following general formulae (Ia) and/or (Ib)

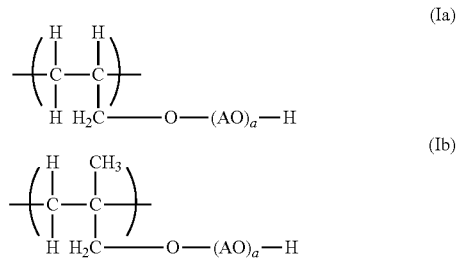

where in each case
A is identical or different and is represented by an alkylene group according to $C_xH_{2x}$ where x=2, 3, 4 or 5,
a is identical or different and is represented by an integer between 11 and 39,
the maleic acid derivative structural unit β being represented by the following general formulae (IIa) and/or (IIb)

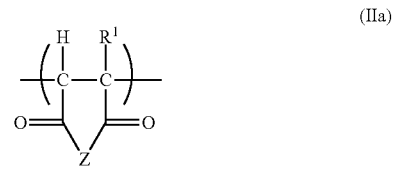

where
$R^1$ is identical or different and is represented by H and/or a straight-chain or branched $C_1$-$C_4$ alkyl group (preferably H);
Z is identical or different and is represented by O and/or NH (preferably O);

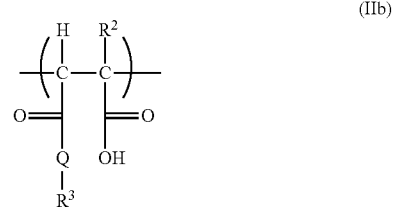

where
$R^2$ is identical or different and is represented by H and/or a straight-chain or branched $C_1$-$C_4$ alkyl group (preferably H);

Q is identical or different and is represented by NH and/or O;

$R^3$ is identical or different and is represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-$(A'O)_\alpha$—$R^4$ where m=0, 1, 2, 3 or 4, e=0, 1, 2, 3 or 4, $A'=C_{x'}H_{2x'}$ where x'=2, 3, 4 or 5 (preferably x'=2) and/or $CH_2C(C_6H_5)H$—, $\alpha$=an integer from 1 to 350 (preferably $\alpha$=15-200) where $R^4$ is identical or different and is represented by a straight-chain or branched $C_1$-$C_4$ alkyl group (preferably $CH_3$).

The determination of a (number of alkoxy groups) in the (meth)allyl alcohol polyether derivative structural unit α according to the general formula (Ia) is effected on the basis of so-called MALDI-TOF-MS measurements (MALDI-TOF-MS is an abbreviation for Matrix Assisted Laser Desorption/Ionization Time Of Flight Mass Spectroscopy). The MALDI-TOF-MS measurements carried out in this context were carried out on a "Bruker Reflex III", equipped with a 337 nm nitrogen laser. The acceleration voltage was 20 kV and the detection of the cation spectra was effected in the reflector mode. Dihydroxybenzoic acid (DHB) was used as a matrix and potassium chloride from Merck KGaA as the salt. The sample was prepared as a solid. For this purpose, in each case a pinch of the corresponding sample was dissolved in THF. A small part of the dissolved sample was then triturated with a pinch of DHB and a pinch of potassium chloride in a mortar. A part of this mixture was applied to a sample target by means of a spatula. The calibration was effected with an external standard which was composed of the following peptides (Pepmix): 10 pm/μl of Bradikinin, 10 pm/μl of Angiotensin I, 10 pm/μl of Angiotensin II, 10 pm/μl of Neurotensin and 10 pm/μl of ACTH. The peptides were dissolved in a mixture of 20% by weight of acetonitrile, 79.9% by weight of $H_2O$ and 0.1% by weight of formic acid. The Pepmix is additionally diluted with $H_2O$. For the calibration, 1 μl of Pepmix was mixed with 1 μl of DHB solution on a spot of the target. A methanol-water mixture in the ratio 1:1 was used as the solvent for the DHB solution. The concentration was 10 mg/ml.

The (meth)allyl alcohol polyether derivative structural unit α is decisively involved in the dispersing effect of the copolymer. The precursor of the corresponding monomeric starting compound is allyl alcohol and/or methallyl alcohol. The latter are products of olefinic chemistry. Allyl alcohol is obtained, for example, in large amounts as an intermediate in the glycerol preparation. In general, it may be said that allyl alcohol may be regarded as an economical intermediate of the chemical industry which is available in large amounts. Furthermore, one mole of methallyl alcohol and one mole of allyl alcohol respectively, each have a lower volume and a lower mass than, by comparison, one mole of 4-hydroxybutyl vinyl ether, which is a considerable advantage on an industrial scale with respect to storage and transport. The abovementioned means that the copolymers according to the invention which are based on alkoxylated (meth)allyl alcohol are correspondingly highly attractive economically. Also important is that the copolymers according to the invention have the excellent performance characteristics of the high-performance superplasticizers which are described above.

Finally, regarding the preparation of the copolymer (polymerization process), it should be mentioned that alkoxylated (meth)allyl alcohol is easier to handle in terms of process engineering, owing to the high resistance to acidic hydrolysis compared with vinyloxybutylenepoly(ethylene glycol).

In the general formulae (Ia) and (Ib) representing the (meth)allyl alcohol polyether derivative structural unit α, x is in each case generally represented by 2 and/or 3, preferably 2. Mixtures of ethoxy and propoxy units are thus normally present, preferably exclusively ethoxy units in the polyether side chain.

In the general formulae (Ia) and (Ib) representing the (meth)allyl alcohol polyether derivative structural unit α, a is in each case represented by an integer between 16 and 28.

As a rule, the (meth)allyl alcohol polyether derivative structural unit α is present in a relative proportion of 35 to 43 mol %.

The maleic acid derivative structural unit β is generally present in a relative proportion of 57 to 65 mol %.

In a preferred embodiment, the (meth)allyl alcohol polyether derivative structural unit α is represented by the general formula (Ia). Alkoxylated allyl alcohol is thus the preferred precursor compared to alkoxylated methallyl alcohol.

Frequently, the maleic acid derivative structural unit β is represented by the general formula (IIb), in each case $R^2$ and $R^3$ being represented by H and Q by O (maleic acid as such is correspondingly present as monomer). The maleic acid derivative structural unit β can be represented by the general formula (IIa), then preferably $R^1$ being represented by H and Z by O (maleic acid anhydride is correspondingly present as monomer). The use of maleic acid and/or maleic acid anhydride as comonomers is thus preferred.

The copolymer according to the invention typically has a weight average molecular weight of 10 000 to 100 000.

As a rule, the copolymer according to the invention is present in aqueous solution which contains 30 to 95% by weight of water and 5 to 70% by weight of dissolved dry matter. The dry matter then usually substantially comprises the anhydrous copolymer.

In addition to the (meth)allyl alcohol polyether derivative structural unit α and the maleic acid derivative structural unit β, the copolymer according to the invention may also have at least one further structural unit, which may, for example, be an acrylic acid structural unit.

The invention furthermore relates to the preparation of the copolymer described above by free radical solution polymerization, water being used as a solvent, so that an aqueous solution is produced, which comprises 30 to 95% by weight, preferably 45 to 65% by weight, of water and 5 to 70% by weight, preferably 35 to 55% by weight, of copolymer dry matter.

Furthermore, the invention relates to a building material mixture containing the copolymer according to the invention and a hydraulic binder and/or a latently hydraulic binder.

Typically, the hydraulic binder is present as cement, lime, gypsum, hemihydrate or anhydrite or as mixtures of these components, but preferably as cement. The latently hydraulic binder is usually present as fly ash, trass or a blast furnace slag.

The present invention is to be described in more detail below with reference to working examples.

Copolymers according to the invention (according to the Preparation Example 1) are to be compared with copolymers which are already successfully used in practice (according to the Comparative Example 1) with regard to the performance thereof.

PREPARATION EXAMPLE 1

(Ex. 1)—Copolymer Type 1 According to the Invention

A glass reactor, equipped with a plurality of feed possibilities, stirrer, thermometer and dropping funnel was loaded with 100 ml of water and 137.8 g of polyethylene glycol monoallyl ether (solution A) and thermostatted at 35° C. A second prepared solution (solution B), consisting of 59 g of water and 19.7 g of maleic anhydride, and 33.2 ml of a 20% strength aqueous sodium hydroxide solution, were metered into solution 1 in the glass reactor. A third solution (solution C), consisting of 7.5 g of sodium hydroxy-methanesulphinate dihydrate and 42.5 g of water, was prepared. Thereafter, 100 mg of iron (II) sulphate, dissolved in a few drops of water, and 12.46 g of 30% strength hydrogen peroxide solution were added to solution A and B. Furthermore, the addition of solution C to the solutions A and B was started, which addition extended over a time period of 2 hours. Finally, by adding 17.8 ml of 20% strength aqueous sodium hydroxide solution a pH of 6.5 was established. The aqueous solution of a copolymer having an average molecular weight of Mw=19 000 g/mol, a polydispersity of 1.7 and a solids content of 41.7% was obtained. The yield of polymer in comparison with polyethylene glycol monoallyl ether not incorporated in the following polymerized units was 87% (determined by gel permeation chromatography).

COMPARATIVE EXAMPLE 1

(Comp. 1)—Corresponding to Copolymer Type 1

Commercial concrete superplasticizer Glenium® 110 (from BASF Construction Polymers GmbH) based on a copolymer of vinyloxybutylenepoly(ethylene glycol) and an ethylenically unsaturated dicarboxylic acid derivative—the polymer according to Comparative Example 1 has a closely related polymer architecture in comparison with copolymer type 1.

First the polymerization behaviour in relation to the achieved molecular weight distribution and conversion is to be considered. Table 1 shows that the preparation of the polymer according to the invention takes place with somewhat higher conversions than those of the comparative polymer. A further criterion for good performance in the concrete is a sufficiently high average molar mass of the polymers.

TABLE 1

Molar masses and conversion of the exemplary and comparative polymer

| Polymer | Mw [g/mol] | Pd | Conversion (%) |
|---|---|---|---|
| Ex. 1 | 19 000 | 1.7 | 84 |
| Comp. 1 | 21 500 | 1.42 | 83 |

Table 1 shows in each case the values for $M_w$ and for the polydispersity (Pd). The product according to the invention has an average molar mass in the range of the comparative polymer. The polydispersity of the polymer according to Ex. 1 is only a little bit larger than that of the polymer according to Comp. 1.

For further evaluation of the copolymers, concrete tests were carried out. The experimental procedures are described in Use Examples 1 and 2. In the tests, it was intended to check whether the copolymers according to the invention showed a good performance, i.e. the same plasticization and the same slump over time, under the same test conditions (w/c value, temperature, aggregates, etc.) and in the same dose.

Carrying Out the Concrete Tests:

280 kg of Portland cement (CEM I 42.5 R, Mergelstetten) were stirred with round aggregates having a composition, according to the Fuller screening curve, at a maximum particle size of 16 mm, 80 kg of limestone powder filler Calcit MS 12 and 156.8 kg of water, which contained the products according to the invention or the comparative products in dissolved form. Immediately after the preparation of the concrete mix, the determination of the slump and the change thereof as a function of time over a period of 60 minutes was effected.

The results of the test are shown in the table below.

TABLE 2

| Admixture | Solid [% by weight] | Dose [% by weight] | Slump in cm after | | | |
|---|---|---|---|---|---|---|
| | | | 0 min. | 10 min. | 30 min. | 60 min. |
| Ex. 1. | 30 | 0.19 | 62.5 | 57 | 49 | 45.5 |
| Comp. 1 | 30 | 0.18 | 60.5 | 59 | 51.5 | 48 | w/c = 0.48, cement: Mergelstetten

Table 2 shows the results of the concrete tests using Mergelstetten cement. For the example polymer, the same plasticization can be observed and the development of the slump over a time period of 60 minutes is comparable.

Overall Conclusion from the Results of the Comparative Experiments:

The above experiments show that the quality of the superplasticizers based on the copolymers according to the invention is outstanding. The performance, seen overall, is comparable with the vinyloxybutylenepoly(ethylene glycol)-based high-performance polymers which have already proved their worth in practice.

The invention claimed is:

1. A dispersant Copolymer for building material mixtures comprising i) 30 to 47 mol % of a (meth)allyl alcohol polyether derivative structural unit α and ii) 53 to 70 mol % of a maleic acid derivative structural unit β, wherein the copolymer is present in aqueous solution which contains 30 to 95% by weight of water and 5 to 70% by weight of dissolved dry matter;

the (meth)allyl alcohol polyether derivative structural unit α being represented by the following general formulae (Ia) and/or (Ib)

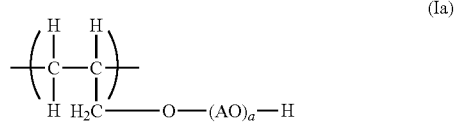

-continued

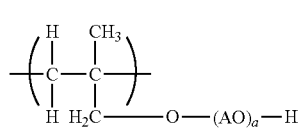
(Ib)

where in each case
A is identical or different and is represented by an alkylene group according to $C_xH_{2x}$ where x=2, 3, 4 or 5,
a is identical or different and is represented by an integer between 11 and 39,
the maleic acid derivative structural unit β being represented by the following general formulae (IIa) and/or (IIb)

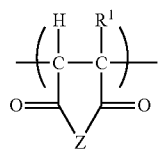
(IIa)

where
$R^1$ is identical or different and is represented by H and/or a straight-chain or branched $C_1$-$C_4$ alkyl group;
Z is identical or different and is represented by O and/or NH;

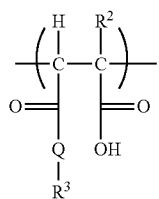
(IIb)

where
$R^2$ is identical or different and is represented by H and/or a straight-chain or branched $C_1$-$C_4$ alkyl group;
Q is identical or different and is represented by NH and/or O;
$R^3$ is identical or different and is represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-(A'O)$_\alpha$—$R^4$ where m=0, 1, 2, 3 or 4, e=0, 1, 2, 3 or 4, A'=$C_xH_{2x'}$ where x'=2, 3, 4 or 5 and/or $CH_2C(C_6H_5)H$—, α=an integer from 1 to 350 where $R^4$ is identical or different and is represented by a straight-chain or branched $C_1$-$C_4$ alkyl group.

2. The dispersant Copolymer according to claim 1, wherein, in the general formulae (Ia) and (Ib) representing the (meth)allyl alcohol polyether derivative structural unit α, x is in each case represented by 2 and/or 3.

3. The dispersant Copolymer according to claim 1, wherein characterized in that, in the general formulae (Ia) and (Ib) representing the (meth)allyl alcohol polyether derivative structural unit α, a is in each case represented by an integer between 16 and 28.

4. The dispersant Copolymer according to claim 1, wherein the (meth)allyl alcohol polyether derivative structural unit α is present in a proportion of 35 to 43 mol %.

5. The dispersant Copolymer according to claim 1, wherein the maleic acid derivative structural unit β is present in a proportion of 57 to 65 mol %.

6. The dispersant Copolymer according to claim 1, wherein the (meth)allyl alcohol polyether derivative structural unit α is represented by the general formula (Ia).

7. The dispersant Copolymer according to claim 1, wherein the maleic acid derivative structural unit β is represented by the general formula (IIb), in each case $R^2$ and $R^3$ being represented by H and Q by O.

8. The dispersant Copolymer according to claim 1, wherein the maleic acid derivative structural unit β is represented by the general formula (IIa), $R^1$ being represented by H and Z by O.

9. The dispersant Copolymer according to claim 1, having a weight-average molecular weight of 10 000 g/mol to 100 000 g/mol.

10. A dispersant Copolymer for building material mixtures comprising
    i) 30 to 47 mol % of a (meth)allyl alcohol polyether derivative structural unit α and
    ii) 53 to 70 mol % of a maleic acid derivative structural unit β,
    the (meth)allyl alcohol polyether derivative structural unit α being represented by the following general formulae (Ia) and/or (Ib)

(Ia)

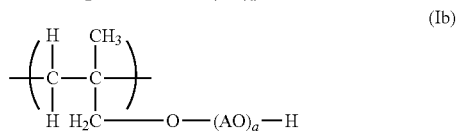
(Ib)

where in each case
A is identical or different and is represented by an alkylene group according to $C_xH_{2x}$ where x=2, 3, 4 or 5,
a is identical or different and is represented by an integer between 11 and 39,
the maleic acid derivative structural unit β being represented by the following general formulae (IIa) and/or (IIb)

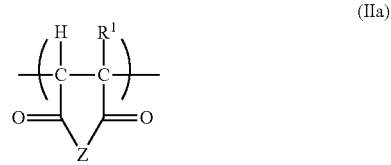
(IIa)

where
$R^1$ is identical or different and is represented by H and/or a straight-chain or branched $C_1$-$C_4$ alkyl group;
Z is identical or different and is represented by O and/or NH;

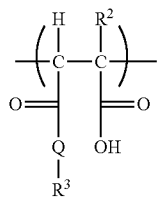 (IIb)

where
R² is identical or different and is represented by H and/or a straight-chain or branched $C_{1-4}$ alkyl group;
Q is identical or different and is represented by NH and/or O;
R³ is identical or different and is represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-(A'O)$_\alpha$—R⁴ where m=0, 1, 2, 3 or 4, e=0, 1, 2, 3 or 4, A'=$C_xH_{2x'}$, where x'=2, 3, 4 or 5 and/or $CH_2C(C_6H_5)H$—, α=an integer from 1 to 350 where R⁴ is identical or different and is represented by a straight-chain or branched $C_1$-$C_4$ alkyl group;
which, in addition to the (meth)allyl alcohol polyether derivative structural unit α and the maleic acid derivative structural unit β also has at least one further structural unit.

11. The dispersant Copolymer according to claim 10, comprising an acrylic acid structural unit as further structural unit.

12. Preparation of a dispersant copolymer according to claim 1 by free radical solution polymerization, water being used as a solvent, so that an aqueous solution is produced, which comprises 30 to 95% by weight of water and 5 to 70% by weight of copolymer dry matter.

13. Building material mixture containing a dispersant copolymer according to claim 1 and a hydraulic binder and/or a latently hydraulic binder.

14. The Building material mixture according to claim 13, wherein the hydraulic binder is present as cement, hemihydrate, anhydrite, lime or gypsum.

15. The Building material mixture according to claim 13, wherein the latently hydraulic binder is present as fly ash, trass or blast furnace slag.

16. The Building material mixture according to claim 13, wherein the hydraulic binder is present as cement.

17. Preparation of a dispersant copolymer according to claim 1 by free radical solution polymerization, water being used as a solvent, so that an aqueous solution is produced, which comprises 45 to 65% by weight of water and 35 to 55% by weight of copolymer dry matter.

18. Building material mixture containing a dispersant copolymer according to claim 10 and a hydraulic binder and/or a latently hydraulic binder.

19. The Building material mixture according to claim 18, wherein the hydraulic binder is present as cement, hemihydrate, anhydrite, lime or gypsum.

20. The Building material mixture according to claim 18, wherein the latently hydraulic binder is present as fly ash, trass or blast furnace slag.

* * * * *